Jan. 13, 1948.   F. W. WIESNER ET AL   2,434,379
APPARATUS AND METHOD OF STRETCH PRESSING METAL SHEETS
Filed Dec. 16, 1944

*INVENTORS*
FRANK W. WIESNER &
ALEXANDER COULTER
BY
*Donald W. Farrington*
ATTORNEY Patented Jan. 13, 1948

2,434,379

UNITED STATES PATENT OFFICE 2,434,379

APPARATUS AND METHOD OF STRETCH PRESSING METAL SHEETS

Frank W. Wiesner and Alexander Coulter, Baltimore, Md., assignors to The Glenn L. Martin Company, Middle River, Md., a corporation of Maryland Application December 16, 1944, Serial No. 568,454

3 Claims. (Cl. 153—48)

Our invention relates to sheet metal forming and more particularly to an improved method and apparatus for stretching metal sheets into various shapes and forms.

The many complicated shapes into which metal parts are formed to meet present day demands for streamlined structures, such as in forming the parts of an airplane skin, are most efficiently accomplished by stretching the metal over die forms constructed and used as stretching blocks. In order to secure an even flow of metal to the desired shape it is necessary that some means be provided for coextensive movement between the sheet metal and the stretching block. Adhesion between the surfaces of these parts causes an uneven flow of the metal producing an unsatisfactory, irregular, wavy surfaced finished product. It may also cause ruptures in the surface of the sheet, or damage to the forming die if great care is not exercised in separating the adhering parts. The method practiced by the art is to paint the material and stretching block with a heavy coating of grease. This method is very unsatisfactory due to the messy and dangerous working conditions created by the large quantity of grease deposited on the material and the press as well as the dangerous slippery condition of the floor and walkway caused by the accumulation of excess grease. The handling of the formed parts in a greasy condition is very hazardous to the workers, causing many cuts to their hands, and body injuries resulting from slips and falls. The removal of the grease is also difficult and has proved to be a very costly, time consuming processing operation.

The present invention provides a method whereby a sheet of rubber or like resilient material acting as a stretching sheet is placed between the stretching block and the sheet to be formed thereby utilizing the resiliency of the material to allow the metal being stretched to move coextensively with the surface of the stretching block and flow into the desired form.

It is among the objects of our invention to provide a method of stretching sheet metal to various shapes, including compound curves, whereby provision is made to utilize the unrestrained free flowing characteristics of the metal to form the desired shape. The use of a sheet of rubber or like substance gives the right degree of resiliency to acquire these results and at the same time removes the possibility of the metal sticking to the die. Such sticking of the sheet would result in an uneven thickness of the material and a waviness in the surface of the finished product.

Another object is to provide a method of stretching metal that eliminates the necessity of coating each part with a lubricant. The elimination of this step in processing greatly reduces the cost of the finished product. It has the further advantage of eliminating the very disagreeable and costly operation of removing the grease from the formed sheets and also has the advantage of eliminating the obnoxious fumes attendant the use of heavy grease on press forms.

Still another object is to provide a method of stretching metal that reduces the spoilage and waste formerly incurred in finishing materials in accordance with the known art. The clean uniform condition of sheets produced by the method of our invention eliminates waste due to defective surfaces as formerly resulted from the ununiform application of the lubricant.

Further objects, advantages and novel features of our invention will be apparent from the following description in which reference is made to the accompanying drawing wherein.

Figure 1:
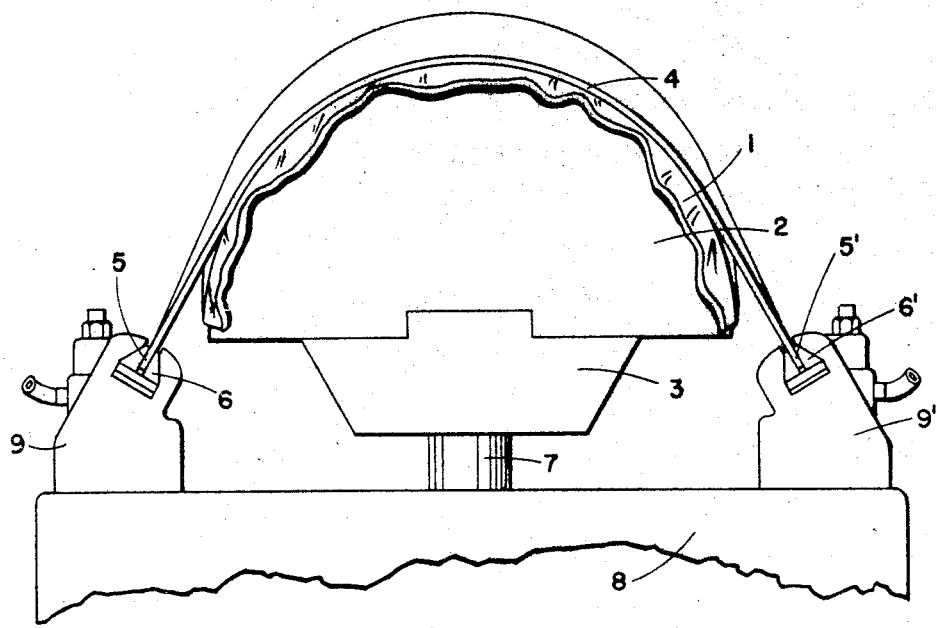
Figure 1 is a partial end view of a stretching press embodying our invention.

Referring more specifically to the drawing, we have illustrated in Figure 1 a sheet of rubber 1 or like resilient material placed over a form die or stretching block 2 in the customary stretching press. The block 2 is supported by a platform 3 arranged to be actuated and forced upward by a hydraulic plunger 7. A sheet of metal 4 to be formed is secured in the stretching press with its edges 5 and 5' held by jaws 6 and 6' operated by hydraulically actuated clamps 9 and 9', supported by base 8. Sufficient slack is allowed in the center portion of the sheet 4 to allow for shaping it to the desired form. The block 2, with the rubber sheet 1 laid smoothly over its forming surface is then forced in an upwardly direction against the inside surface of sheet 4 by means of the hydraulic plunger 7 acting against supporting table 3. The forcing of the table 3 upward presses block 2, covered by rubber sheet 1, against the formable sheet 4 shaping it to conform to the shape of the stretching block 2. The sheet to be formed may be of any strong ductable material such as steel, aluminum, or their alloys.

Figure 2:
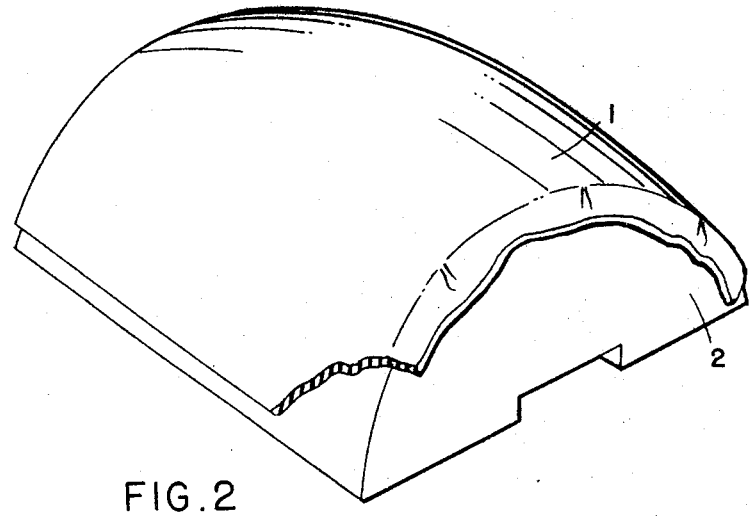
Figure 2 is a perspective sectional view of a stretching block and the stretching sheet of our invention arranged for positioning in a stretching press.

The metal of the formable sheet 4 is caused to flow evenly to the shape of the block which may consist of any number of complex shapes common to the aircraft industry, such as the compound curved form illustrated in Figure 2. Coextensive movement of the metal of the formable sheet with the stretching block is furthered by the resilience of the rubber sheet 1 by preventing sticking of the material to the form which would result in unevenness in the finished product. Upon the completion of the stretching operation pressure against table 3 is released, allowing the block 2 to drop freely away from the formable sheet 4 in its then formed condition. The stretching sheet 1 may be readily removed from sheet 4, leaving the surface of said formed sheet in a smooth clean condition ready for further immediate processing.

The low cost and long life of the material used in the method of our invention as compared to the prior art methods is marked and is an important feature from the large scale production standpoint. We are aware that prior to our invention other forming machines have been made with stretching forms operating in connection with sheet holding devices; therefore, we do not claim such a combination broadly, and that we have shown and described one embodiment of our invention as illustrative only. It is also to be appreciated that certain changes, alterations, modifications and substitutions can be made without departing from the spirit and scope of the claims.

We claim as our invention:

1. In a sheet forming machine having a moveable table, a stretching block having a forming surface adapted to be carried by said moveable table, a sheet of metal held by its edges in unstressed condition over said block, a sheet of rubber-like material having predetermined flow characteristics when subjected to pressure and proportioned with respect to the stretching block to cover and overhang the edges of the forming area of said stretching block to provide for unrestrained flow with the sheet of metal on application of pressure thereagainst by an upward movement of the stretching block during the forming of the sheet, and means to move the block with respect to the restrained edges of the metal sheet.

2. A machine for forming sheet metal comprising a moveable stretching block having a forming surface, a stretching sheet of rubber adapted to flow when subjected to pressure arranged between the forming surface of said stretching block and the sheet of metal to be formed, said stretching sheet being unrestrained at the edges of the block and proportioned to exceed the area of the working surface of the stretching block so as to provide for unrestrained movement of the metal sheet relative to the stretching block responsive to forming movement of said block, and means fixed with respect to said block to hold said metal sheet by its edges free of the stretching block and means for moving the block and stretching sheet to apply forming pressure against said restrained sheet of metal.

3. That method of forming compound curved surfaces in a sheet of metal by stretching that comprises securing a sheet of metal in a stretch press over a stretching moveable forming block, separating the sheet of metal from the forming block by a sheet of rubber-like material having preetermined flow characteristics free of the block and metal sheet at the edges of the block, forming the sheet by the exertion of pressure thereon through the forming block and the sheet of rubber-like material whereby said rubber-like material is free to flow outwardly from the center of the area being formed to accommodate forming movement of the metal sheet, and releasing the pressure of the press to effect freeing of the stretching sheet from the formed sheet by the return of said stretching sheet to its original shape.

FRANK W. WIESNER.
ALEXANDER COULTER.

REFERENCES CITED

The following references are of record in the file of this patent:

UNITED STATES PATENTS

| Number | Name | Date |
|---|---|---|
| 385,778 | Spencer | July 10, 1888 |
| 1,032,907 | Hyde | July 16, 1912 |
| 1,178,443 | Finger | Apr. 4, 1916 |
| 1,207,326 | Rehbein | Dec. 5, 1916 |
| 1,267,591 | Rehbein | May 28, 1918 |
| 1,268,360 | Kimball | June 4, 1918 |
| 1,844,487 | Tyrrell | Feb. 9, 1932 |
| 2,245,723 | Salzmann | June 17, 1941 |
| 2,279,965 | Berliner et al. | Apr. 14, 1942 |
| 2,326,470 | Lermont et al. | Aug. 10, 1943 |
| 2,379,964 | Berliner | Apr. 14, 1942 |

OTHER REFERENCES

H. F. Vollner, article in Machinery, July 1944; pp. 157–163.